United States Patent

Geffken

[15] 3,671,828

[45] June 20, 1972

[54] METHOD AND CONTROL SYSTEM FOR D.C. ELECTRIC MOTOR DRIVE MEANS

[72] Inventor: John H. Geffken, Williamsville, N.Y.

[73] Assignee: Westinghouse Electric Corporation, Pittsburgh, Pa.

[22] Filed: April 21, 1970

[21] Appl. No.: 30,500

[52] U.S. Cl. ..................................................318/164
[51] Int. Cl. ..................................................H02p 5/06
[58] Field of Search...................318/114, 132, 164, 72, 85

[56] References Cited

UNITED STATES PATENTS

| | | | |
|---|---|---|---|
| 1,450,339 | 4/1923 | Smith | 318/164 |
| 2,597,046 | 5/1952 | Sendzimir | 318/114 |
| 3,331,239 | 7/1967 | Larsen | 318/132 |
| 3,448,819 | 6/1969 | Peterson | 318/85 |

*Primary Examiner*—Harold Broome
*Assistant Examiner*—Thomas Langer
*Attorney*—F. H. Henson, R. G. Brodahl and J. J. Wood

[57] ABSTRACT

This disclosure relates to a method and a control system for a d.c. electric motor drive coupled to an oscillating load for the dual purposes of regulating the periodic velocity of the oscillating load in conformance with a predetermined function, and for the purpose of controlling the magnitude of the velocity excursion. A first component of armature current is applied to the electric motor drive for maintaining the motor speed constant, independently of cyclic perturbations in the load, and a second component of armature current is applied to the drive motor to provide a periodically variable disciplinary torque to compel the velocity excursions of the load to comply with the predetermined velocity patterns.

4 Claims, 5 Drawing Figures

INVENTOR
John H. Geffken
James J. Wood
ATTORNEY

PATENTED JUN 20 1972 3,671,828

METHOD AND CONTROL SYSTEM FOR D.C. ELECTRIC MOTOR DRIVE MEANS

BACKGROUND OF THE INVENTION

1. Field of the Invention

This invention relates to a method and control system for a d.c. electric motor drive means coupled to an oscillating load, for the purpose of constraining the periodic load velocity to a predetermined function, and to control the magnitude of the velocity excursion.

2. Description of the Prior Art

Problems affecting the performance and efficiency of d.c. motor drive systems are discussed in an article entitled "Mechanical Factors Affecting Electrical Drive Performance" by Woodward C. Carter in IEEE Transactions on Industry and General Application Volume IGA-5 No. 3 May/June 1969 at pages 282 to 290. This article, describes mechanical characteristics such as torsional vibrations, backlash, and disturbances generated by misalignment, unbalance, or pulsating loads. The author suggests that, in general, the system must be made either responsive enough to counteract the mechanical characteristics or sluggish enough to ignore it. The author further states that if this compromise regarding system response is impractical or undesirable, the mechanical characteristics and/or the drive characteristics must be modified until an acceptable compromise can be achieved.

The instant invention is concerned primarily with the difficulties posed by oscillating loads particularly, in the environment of the continuous casting of steel.

SUMMARY OF THE INVENTION

This invention relates to a method for regulating d.c. electric motor drive means coupled to an oscillating load to conform the periodic load velocity to a predetermined function and to control the magnitude of the velocity excursion. A first component of armature current is provided for the d.c. electric motor drive means for maintaining the motor speed constant independently of periodic perturbations in the load, and a second component of armature current is provided for the motor drive means to provide a periodically variable disciplinary torque which is a function of the perturbations of the oscillating load from the predetermined function.

A control system is further provided for a d.c. electric motor drive means coupled to an oscillating load so as to confine the periodic velocity of an oscillating load to a predetermined velocity function, and to control the magnitude of the velocity excursion. Means are provided for supplying a first component current to the d.c. electric motor drive for maintaining the motor speed constant independently of cyclic perturbations in the load. Means are also provided for producing displacement signals which are a function of the instantaneous deviation of the load from the predetermined function, and finally, means are provided for receiving the displacement signals, and providing a second varying component of armature current for the d.c. electric motor drive means as a function of the displacement signals to thereby provide a variable disciplinary torque for the motor means to compel compliance with the predetermined velocity function.

BRIEF DESCRIPTION OF THE DRAWINGS

For a better understanding of the invention, reference may be had to the exemplary embodiment shown in the accompanying drawings, in which.

DETAILED DESCRIPTION OF EXEMPLARY EMBODIMENT

The method and control system of the instant invention were developed in the environment of the continuous casting of steel. Since continuous casting is relatively new, it will be helpful to briefly review the overall casting process in order to appreciate the contributions of the instant invention. Molten steel from an electric, basic oxygen or open hearth furnace is delivered to the casting floor at the top of a casting tower in conventional brick lined steel ladles. The hot metal is then poured from the ladle into a tundish, which is a refractory lined intermediate reservoir designed to deliver a low velocity slag-free stream of molten metal to an oscillating mold by means of a ceramic tube. Curved water cooled copper molds gradually turn a descending, slowly solidifying stream of metal, from vertical to horizontal. The molds are aided by a subsequent series of rollers that control the thickness of the slab and complete bending, sending it out horizontally for further rolling and eventually to a cutoff torch. Cooling begins in the water cooled molds and continues under water sprays that inundate the stream of steel as it progresses on its way down the tower.

In the continuous casting process this invention is concerned with the mold receptacle described above which is caused to oscillate to prevent sticking as the steel partially solidifies within. Cold water running down the sides of the mold produce a solidified skin effect on the outside of the steel, whereas the interior remains relatively molten. The major problem is to keep the outside of the steel relatively hard, while at the same time the molten interior is kept in a semi-fluid state to enable ease of handling and bending as the steel descends to the casting floor. The rate of oscillation of the mold is dependent on the mold stroke length and the casting speed. Metallurgists consider it highly desirable that the mold oscillate slightly faster than the line or strand casting speed of the steel, and also that the motion (velocity) of the mold be confined to some known periodic mathematical function. Any deviation from either the desired periodic function or the speed is believed to adversely affect the quality of the resulting steel product.

Figure 2:
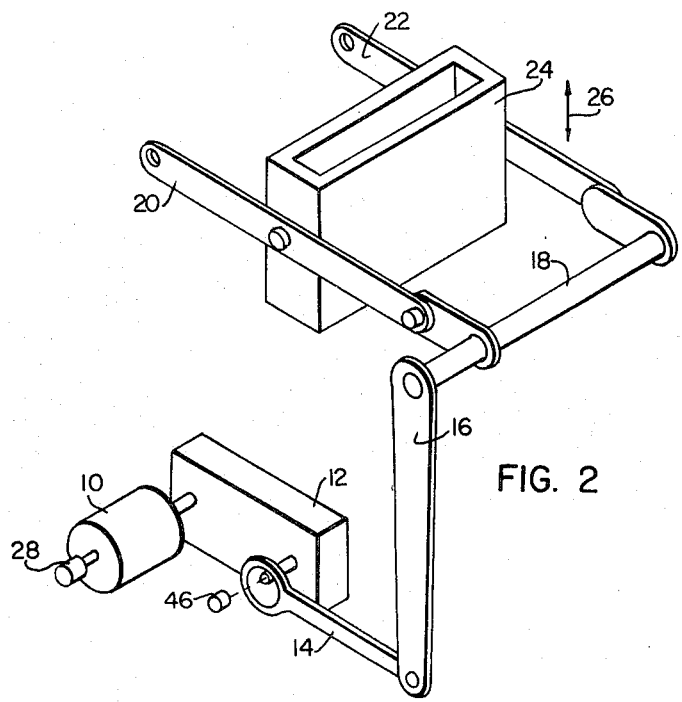
FIG. 2 is a pictorial schematic of the mechanical arrangement for the oscillating mold.

A typical mechanical arrangement for producing mold oscillation is shown in FIG. 2. A d.c. drive motor 10, coupled through a gear reducer 12 imparts motion to an eccentric arm 14, which by means of a connecting rod 16 imparts motion to a bell crank shaft 18. Support levers 20, 22, coupled to a mold 24 and to the bell crank shaft 18, impart motion to the mold 24. In the specific embodiment shown in FIG. 2, the motion imparted to the mold is an up and down motion or vertical displacement as indicated by the double headed arrow at 26. The displacement of the mold 24 in the directions indicated by the arrow 26 provides a harmonic motion or a sinusoidal function. Although the motion imparted to the mold 24 is a sine wave, the invention is not so confined and in other arrangements a sawtooth displacement pattern may be utilized. In the practical embodiment the stroke length may be mechanically adjusted from about one-fourth of an inch to 1½ inches. The periodic function described is determined by the design of the mechanical system which assumes constant motor speed. Obviously, in order to obtain other displacements, different mechanical arrangements may be required rather than the eccentric-bell crank depicted. The speed of the motor is monitored by a tachometer generator 28.

The mold 24 my weigh in the order of 5 tons, and as will be appreciated from principles of mechanics, the gravitational force aids the drive force in one direction and opposes it in the other, so that a large periodic disturbance occurs at the same frequency as the oscillation. The desired frequency may range from 1/10 to 2 strokes per second.

Figure 3A:
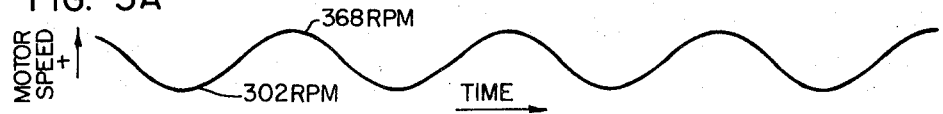
FIGS. 3A and 3B are curves showing the motor speed and the armature current respectively of a typical prior art d.c. electric motor drive, without the correction provided by the instant invention.
Figure 3B:
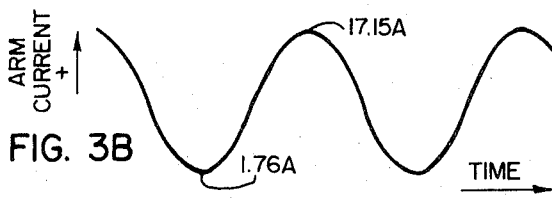

In FIG. 3A there is shown the actual motor speed of one installation which as may be seen, results in a change in motor speed from 302 to 368 RPM. In FIG. 3B there is shown the periodic changes in the motor armature current. As previously indicated, this results, inter alia, from the fact that on the down stroke of the mold, gravity is aiding the electromechanical drive so that the tendency is to go a little faster, Ideally the rectilinear motion of the oscillating mold is simple harmonic motion, and may be described by the well known relationship:

1. $s = a \cos \beta$
   where $s$ = the linear displacement
   $a$ = the amplitude of vibration
   $\beta$ = the angular displacement (2) $$\text{But } \beta = \int_0^t \omega_s \, dt$$

where
   $\omega_s$ = the angular velocity of the eccentric in radians/sec
   $t$ = time in seconds Performing the indicate integration in (2):

3. $\beta = \omega_s t$

Substituting in equation (1):

4. $s = a \cos \omega_s t$

Differentiating equation (4( to find the velocity:

5. $v = (ds/dt) = -a \omega_s \sin \omega_s t$

Figure 4:
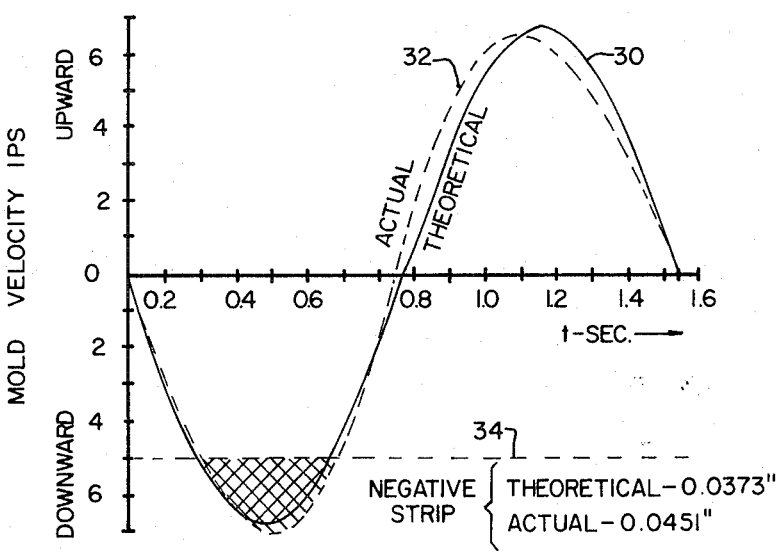
FIG. 4 is a velocity vs. time diagram, depicting the actual and the theoretical mold velocities, the curves being used in explaining the operation of the invention.

Equation (5) is plotted as the sine wave identified at 30 in FIG. 4. This is the theoretical or desired velocity function. It has been found that $\omega_s$ is not a constant. As shown in FIG. 3A the speed of the motor varies. (The angular velocity of the eccentric to a close approximation varies in the same order of magnitude.)

The actual velocity will now be derived.

Let
   $\omega_t$ = the true or actual angular velocity
   $\omega_s$ = the steady state angular velocity
   $\omega_v$ = the angular velocity of the perturbations depicted in FIG. 3A. Note this is approximately a sine function.
   $\phi$ = the phase angle between the velocity v time curve of the oscillating mold. (In the practical embodiment this is about 30° or $\pi/6$ radians.)

The true angular velocity is thus the steady state value added to the perturbation velocity curve of FIG. 3A.

6. $\therefore \omega_t = \omega_s - \omega_v \cos(\omega_s t + \phi)$ (7) $$\beta_t = \int_0^t \omega_t \, dt$$

where
   $\beta_t$ = the true or actual angular displacement $$\beta_t = \int_0^t \omega_t \, dt = \int_0^t \omega_s \, dt - \int_0^t \omega_v \cos(\omega_s t + \phi) \, dt \quad (8)$$

Performing the indicated integration:

9. $\beta_t = \omega_s t - (\omega_v/\omega_s) \sin(\omega_s t + \phi) + C$
   where $C$ is a constant of integration The harmonic motion equation (1) may be rewritten for $\beta_t$ thus:

10. $s = a \cos \beta_t$

Substituting equation (9) in equation (10):

$$s = a \cos [\omega_s t - \omega_v/\omega_s \sin(\omega_s t + \phi) + C] \quad (11)$$

Differentiating Equation (11) to obtain velocity $v_t$ $$v_t = \frac{ds}{dt} = -a [\omega_s - \omega_v \cos(\omega_s t + \phi)]$$

$$\sin \left[\omega_s t - \frac{\omega_v}{\omega_s} \sin(\omega_s t + \phi) + C\right] \quad (12)$$

Equation (12) is plotted as the sine wave identified at 32 in FIG. 4. This is the actual velocity pattern which would occur without using the teachings of the instant invention.

In FIG. 4, the origin is at the top of the mold stroke (i.e. $\beta = 0$), and as indicated on the ordinate, the downward stroke of the mold velocity is depicted by the negative lobe, whereas the upward stroke is depicted by the positive lobe. The strand casting speed is identified by the straight line at 34; this is the speed at which the molten steel is moving from the vertical down to the horizontal. It is desirable to have the downward speed of the mold greater than that of the strand or casting speed. It is believed this causes a compressive force on the top of the steel as it leaves the mold, aiding in the quality of the steel, and helping to preserve the rigidity of the strip of material as it leaves the mold. Integrating the area between the casting speed line 34, and the mold velocity curve 30 gives an average negative strip magnitude of 0.0373 inches. Similarly, the area between the strand casting speed line 34 and the actual velocity curve 32 gives an average negative strip magnitude of 0.0451 inches or almost 21 percent more. The negative strip leaves grain patterns in the steel and therefore the mold velocity should conform as close as possible to the theoretical velocity curve 30.

In order to improve performance in accordance with the teachings, the instant invention proposed that an additional armature current reference be supplied so that the armature current for the motor will provide a variable torque to always counteract the changing load without the necessity of any action by the speed controller loop of the motor drive control system.

Figure 1:
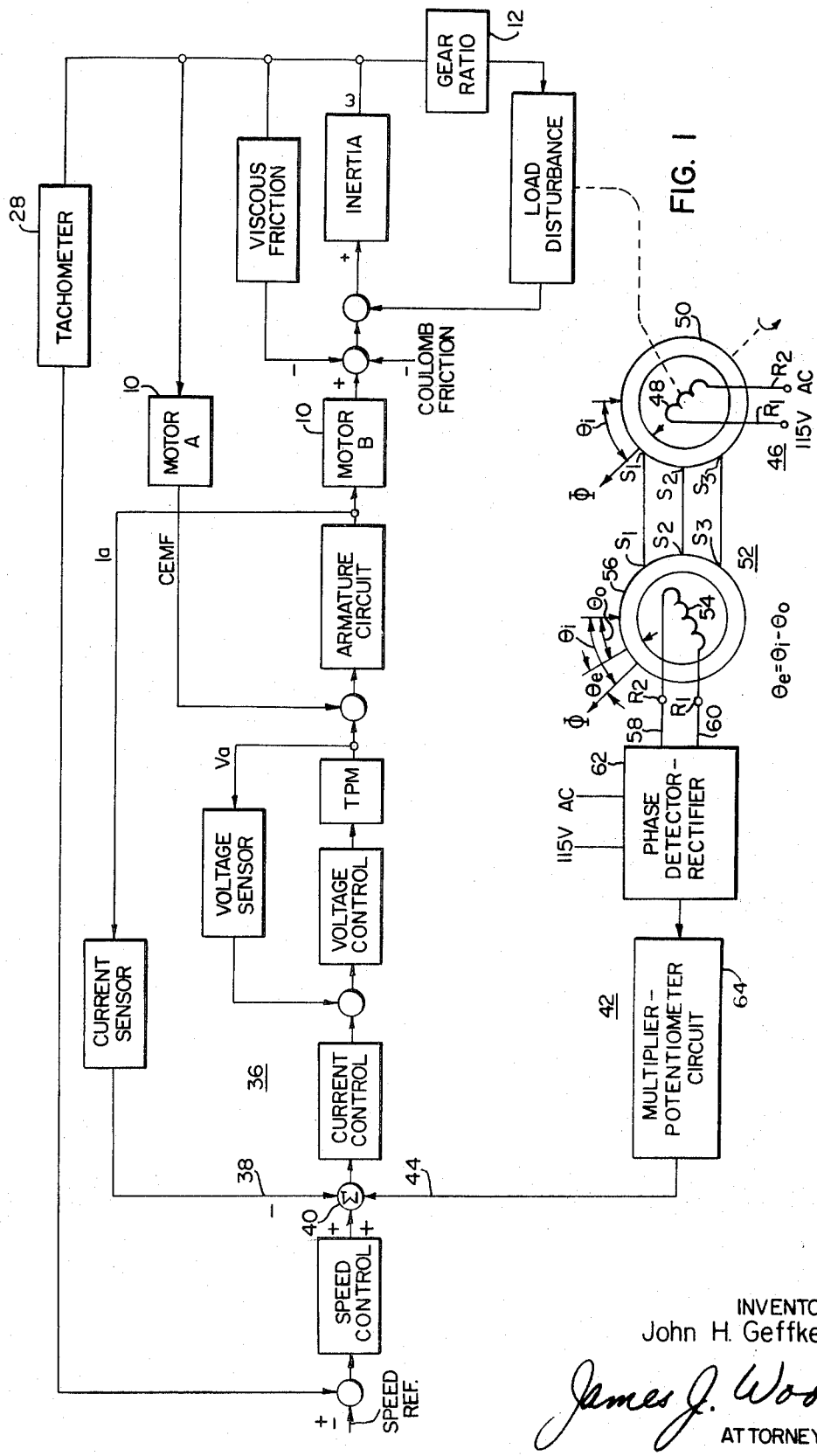
FIG. 1 is a block diagram of the control system for a d.c. electric motor drive in accordance with the invention.

Referring now to FIG. 1, the prior art speed controller is indicated generally at 36 and is shown in block diagram form. This speed controller 36 provides a first component of armature current applied at 38 to the summing point identified at 40; this is the prior art. It is proposed that a load perturbation feedback path indicated generally at 42 provides an additional component of armature current at 44 applied through the summing point 40. The two armature current references then would exist for different purposes. The first, armature current component 38, would supply the steady state component for maintaining the motor speed constant. The additional component of armature current 44 provided by the load perturbation loop 42 would supply the additional kinetic energy required to provide an additional periodic variable torque to enable the motor to drive the mold more nearly in conformity with the desired velocity pattern, and in the case under consideration this could mean a true sine wave.

In FIG. 1 the block diagram concerned with loop 36 will not be described since it is will known in the art. The load perturbation 42 will now be described. A displacement transducer means is coupled to the mold so as to provide signals concerning the instantaneous displacements of the mold. In the present embodiment the displacement transducer means is a selsyn transmitter or generator indicated symbolically at 46 having its rotor 48 coupled to the eccentric arm 14 in any convenient manner (FIGS. 1 and 2). The rotor 48 is connected to a source of 115 a.c. potential as indicated. The stator of the transformer 46 is identified at 50. A differential transformer identified generally at 52 comprises a rotor 54 and a stator 56. The selsyn transmitter 46 is connected to the differential transformer 52 by means of the stator windings identified in common at S1, S2 and S3 respectively. In the transmitter 46 the arrows indicate the position of the rotor 48 relative to the stator 50. In the differential transformer 52, the arrows indicate electrical zero by their coincidence. The output from the transformer rotor 54 is taken from the terminals at 58, 60 and applied to a phase detector or demodulator circuit 62. The phase detector 62 is also connected to a 115 volt a.c. source as indicated in the drawing, and the output of the demodulator 62 is applied to a multiplier-potentiometer circuitry 64 which supplies the second component of armature current 44 to the summing point 40.

OPERATION OF THE EXEMPLARY EMBODIMENT

During start up, the rotor 54 of the differential transformer 52 is rotated. The speed of the motor 10 is monitored by a tach and applied to an oscilloscope. The oscilloscope pattern is similar to the motor speed depicted in FIG. 3A. The rotor 54 is then rotated until the speed curve approaches a straight line; the rotor 54 is then locked in place.

During dynamic operation, as the mold 24 goes through its vertical displacements, the selsyn transmitter 46 is coupled to the eccentric arm 14 (FIG. 2) and goes through complementary rotary displacements. As the rotor 48 of the selsyn transmitter 46 rotates through an angle $\theta_i$, it produces a flux indicated at $\Phi$. This rotation produces a corresponding change in the flux $\Phi$ of the differential transformer 52 since the respective stator coils S1, S2, S3 are connected together. The rotor 54 of the differential transformer 52 is locked in position. The rotor angle $\theta_o$ of the differential transformer 52 is measured from the electrical zero position as indicated. The magnitude of the error voltage induced in the rotor 54 varies with the angle $\theta_e = \theta_i - \theta_o$. Since the $\theta_i$ is varying as the selsyn transmitter 46 rotates, then $\theta_e$ varies. The result is an alternating voltage applied from the rotor terminals 58, 60 to the phase detector 62 which detects the phase angle between the a.c. signal from the supply mains 115 volts a.c. and the a.c. error signal, and after full wave rectification, develops a d.c. signal which is proportional to the phase difference. The a.c. signal from the supply mains is used as the standard of comparison since sine wave oscillation is desired. The deviations of the mold 24 from a true sine wave are brought about by gravity, which subtracts from the motor torque on the up-stroke and aids the torque on the downstroke. This produces a distorted sine wave, the distortion being reproduced exactly by the selsyn transmitter 46. The phase detector rectifier circuit 62 produces a + or − d.c. error signal depending upon the phase angle between the true sine wave and the actual sine wave, the d.c. error signal being then applied to the summation point 40. The d.c. signal is applied to the multiplier potentiometer circuitry 64.

Depending upon the particular installation, the d.c. output of the phase detector is adjusted by multipliers to increase or decrease the signal strength and potentiometers to enable coarse and fine trimming. The current references 44 applied to the summing point 40 may thus be adjusted to be compatable with the local installation.

It will therefore be apparent that there has been disclosed a method and control system for an electric motor drive for regulating the periodic velocity of an oscillating load in conformance with a predetermined velocity function and for controlling the magnitude of the velocity excursion thereof.

I claim:

1. The method for regulating d.c. electric motor drive means coupled to an oscillating load to force the periodic velocity thereof into a predetermined velocity pattern and to control the magnitude of the velocity excursion, comprising the steps of:
   a. providing a first component of armature current for said d.c. electric motor drive means for maintaining the speed of said motor means constant; and
   b. providing a second component of armature current for said d.c. electric motor drive means to produce a periodically variable disciplinary torque which is a function of the deviation of the oscillating load from said predetermined velocity pattern, to constrain compliance therewith.

2. The method for regulating d.c. electric motor drive means coupled to an oscillating load so as to force the periodic velocity thereof to a predetermined function and to control the velocity magnitude, comprising the steps of:
   a. providing a first component of armature current for said d.c. electric motor drive means for maintaining motor speed constant independently of periodic perturbations in said load;
   b. providing an indication of the periodic displacement of said load from said predetermined function; and
   c. providing a second component of armature current for said d.c. electric motor drive means as a function of said indication of periodic displacement and of said velocity magnitude.

3. A control system for d.c. electric motor drive means coupled to an oscillating load to force the periodic velocity thereof into a predetermined velocity pattern and to control the magnitude of the velocity excursion comprising:
   a. means for supplying a first component of armature current to said d.c. electric motor drive means for maintaining the speed of said motor means constant independently of cyclic perturbations of said load;
   b. means for providing displacement signals which are a function of the instantaneous deviating of said load from said predetermined velocity pattern; and
   c. means for receiving said displacement signals and providing a second component of armature current for said electric motor drive means as a function of said displacement signals to provide a periodically variable disciplinary torque for said motor means to compel compliance with said predetermined velocity pattern.

4. A control system according to claim 3 wherein the b'. means for providing displacement signals comprises a selsyn transmitter having a rotor adapted for rotational displacement as a function of the displacement of said load, the loss of the resulting rotational flux proving said displacement signals.

* * * * *